C. A. PERKINS.
EGG HOLDER.
APPLICATION FILED DEC. 11, 1915.
1,198,146. Patented Sept. 12, 1916.
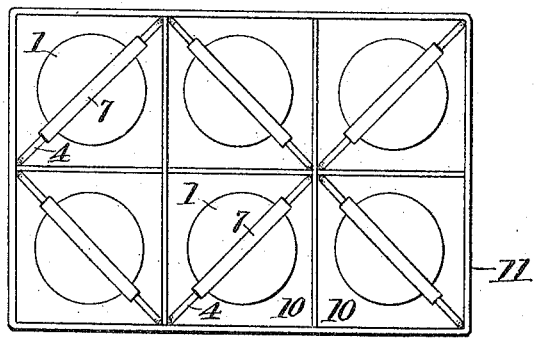
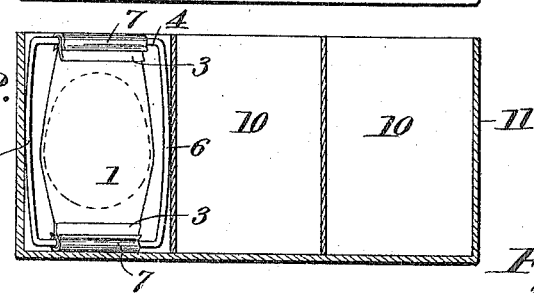
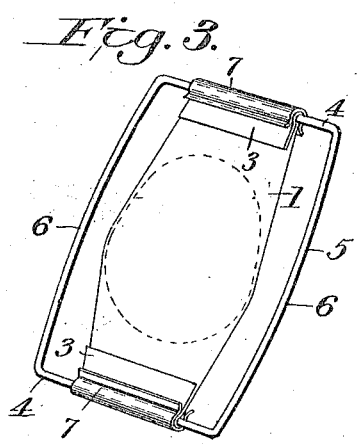
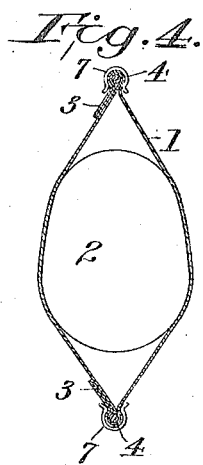
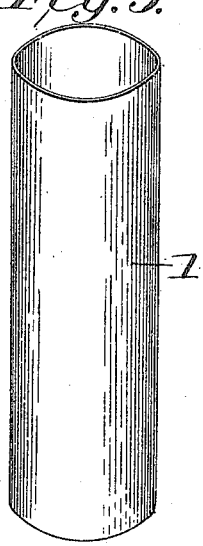
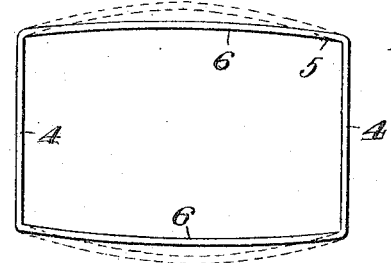
Inventor
Chester A. Perkins
By George J. Oltsch
Attorney

UNITED STATES PATENT OFFICE.

CHESTER A. PERKINS, OF SOUTH BEND, INDIANA.

EGG-HOLDER.

1,198,146.   Specification of Letters Patent.   Patented Sept. 12, 1916.

Application filed December 11, 1915. Serial No. 66,364.

*To all whom it may concern:*

Be it known that I, CHESTER A. PERKINS, a citizen of the United States, residing at South Bend, in the county of St. Joseph and State of Indiana, have invented certain new and useful Improvements in Egg-Holders, of which the following is a specification.

The invention relates to improvements in egg holders for egg cases.

The object of the present invention is to improve the construction of egg holding devices, and to provide a simple, practical and efficient egg holder of inexpensive construction adapted to be readily applied to the cells of an ordinary egg case and capable of yieldably supporting the eggs in the egg cells in spaced and protected relation with the walls thereof taking up all side jar whereby the eggs may be shipped in perfect safety without liability of breaking the eggs.

A further object of the invention is to provide an egg holder having a resilient supporting frame carrying the egg in suspended position and adapted to be arranged diagonally in an egg cell in interlocked relation with the corners of the egg cell, whereby it is securely held in an upright position and may be easily and conveniently introduced into and removed from the egg cell without danger of breaking the egg.

With the above and other objects in view, the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

In the drawings: Figure 1 is a plan view of an egg case provided with egg holders constructed in accordance with this invention. Fig. 2 is a vertical sectional view of the same. Fig. 3 is a perspective view of one of the egg holders. Fig. 4 is a longitudinal sectional view of the same. Fig. 5 is a perspective view of one of the flexible egg carriers. Fig. 6 is a plan view of the resilient frame, the sides being shown bowed outwardly in dotted lines. Fig. 7 is a detailed perspective view of one of the clips.

Like numerals of reference designate corresponding parts in the several figures of the drawing.

In the accompanying drawing, in which is illustrated the preferred embodiment of the invention, 1 designates a flexible egg carrier consisting of a tubular element or member, preferably of oiled paper or other suitable flexible material adapted after an egg 2 is inserted therein to have its ends collapsed or compressed to form supporting terminals 3, which are doubled or folded over the ends 4 of an oblong frame 5. The frame 5 is flexible, being preferably constructed of resilient wire and its sides 6 are adapted to be bowed or flexed outwardly as illustrated in dotted lines in Fig. 5 of the drawing to enable the ends 4 to be squeezed or compressed inwardly to place the flexible frame under tension in applying the terminals 3 of the egg carrier thereto.

The supporting terminals 3 are clamped to the ends of the flexible frame by metallic clips 7 and when the flexible frame is relieved of the pressure of the hand of the operator after he has applied the tubular carrier or member to the said frame, the latter through its resiliency will tend to resume its normal form and the said egg carrier will be held under spring tension with the egg in spaced relation with the sides and ends of the frame. The metallic clips consist of a suitable length of resilient sheet metal or other suitable material folded longitudinally to form two sides or jaws 8 which have their longitudinal edges flared outwardly to enable the clips to be readily sprung into engagement with the supporting terminals 3 of the egg carrier and the ends 4 of the flexible frame. The clip 7 is curved to conform to and embrace the said supporting terminals and the frame, and the former are firmly clamped on the ends of the latter.

The holders are adapted to be placed in the cells 10 of an egg case 11 of any desired construction and the sides 6 which are slightly bowed outwardly are arranged in an upright in two of the diagonally opposite corners of the egg cell, the frame being preferably of a size to enable the said sides 6 to engage the corners of the cell firmly and yieldably. By this construction and arrangement, the eggs are supported free from contact with the walls of the egg cell and the partitions separating the fillers when the egg holders are arranged in a crate or case of considerable size. The egg holders are adapted for use in crates, cases or packages of any desired size and the wire frames are preferably disposed with their sides contiguous to one another at the adjacent corners of the egg cells, as illustrated in Fig. 1 of the drawings, so as to be mutually supporting.

What is claimed is:—

1. An egg holder including a resilient frame adapted to be compressed to flex the frame, and a flexible egg carrier having its terminal portions secured to the compressed portions of the frame, whereby the reflex action of the frame will hold the carrier under tension.

2. An egg holder including a flexible egg carrier adapted to receive an egg and having supporting terminal portions and an open resilient compressible frame adapted to have the terminal supporting portions of the egg carrier secured to opposite portions of it while it is in a compressed condition, whereby the frame is adapted to expand and hold the carrier under spring tension.

3. An egg holder including a resilient substantially rectangular frame adapted to be compressed at two of its sides to flex the other sides of the frame, a flexible egg carrier having its terminal portions folded over the compressed sides of the frame and clips securing the carrier to the frame.

4. The combination with an egg case having egg cells, of egg holders including open flexible frames disposed diagonally of the egg cells and engaged with opposite corners thereof, and an egg carrier secured within the frame and yieldably suspended within the egg cell in spaced relation with the wall of the same.

5. The combination with an egg case having egg cells, of egg holders including open flexible frames disposed diagonally of the egg cells and engaged with opposite corners thereof, and an egg carrier secured within the frame and yieldably suspended within the egg cell in spaced relation with the wall of the same, said frames being arranged at an angle to one another in the contiguous corners of the adjacent cells so as to be mutually supporting.

In testimony whereof I affix my signature in presence of two witnesses.

CHESTER A. PERKINS.

Witnesses:
L. W. HAMMERSCHMIDT,
GEORGE J. OLTSCH.

Copies of this patent may be obtained for five cents each, by addressing the "Commissioner of Patents, Washington, D. C."